United States Patent [19]

Turnbo

[11] 4,184,792
[45] Jan. 22, 1980

[54] VACUUM-TUBE MASS-TRANSIT SYSTEM

[76] Inventor: August Z. Turnbo, 213 S. 4th St., Douglas, Wyo. 82633

[21] Appl. No.: 901,340

[22] Filed: May 1, 1978

Related U.S. Application Data

[63] Continuation-in-part of Ser. No. 745,589, Nov. 29, 1976, abandoned.

[51] Int. Cl.² .................................................. B65G 51/20
[52] U.S. Cl. ........................................ 406/51; 406/84; 406/110; 406/186
[58] Field of Search ........................ 243/1, 2, 4, 19, 21, 243/23, 24, 28, 38; 104/138 R, 155, 70, 72

[56] References Cited

U.S. PATENT DOCUMENTS

| | | | |
|---|---|---|---|
| 548,256 | 10/1895 | Idler | 104/70 |
| 805,168 | 11/1905 | Stoddard | 243/21 |
| 891,324 | 6/1908 | Burton | 243/23 |
| 1,520,217 | 12/1924 | Auperl | 104/70 |
| 1,813,625 | 7/1931 | Knox | 243/2 |
| 3,352,517 | 11/1967 | James | 243/2 |
| 3,980,024 | 9/1976 | Futer | 243/2 |

Primary Examiner—Jeffrey V. Nase
Attorney, Agent, or Firm—Boniard I. Brown

[57] ABSTRACT

A vacuum-tube mass-transit system comprising at least one continuous, tubular, vehicle conveyor having a fan or blower station arranged at each terminating end thereof, wherey a partial vacuum is generated within the tubular conduit to impart linear motion to a vehicle movably disposed within the tubular conveyor conduit, the vehicle being formed as an elongated capsule to receive passengers and cargo, or of a spherical capsule for just cargo. Included in the system is a water moat which defines a loading and unloading area for both passengers and cargo located at each end of the tubular conveyor adjacent the blower station; and wherein one or more booster stations are included having a vacuum by-pass system to allow the vehicle to stop for intermediate loading and unloading, wherein the system includes a plurality of sequentially operated control gates.

15 Claims, 13 Drawing Figures

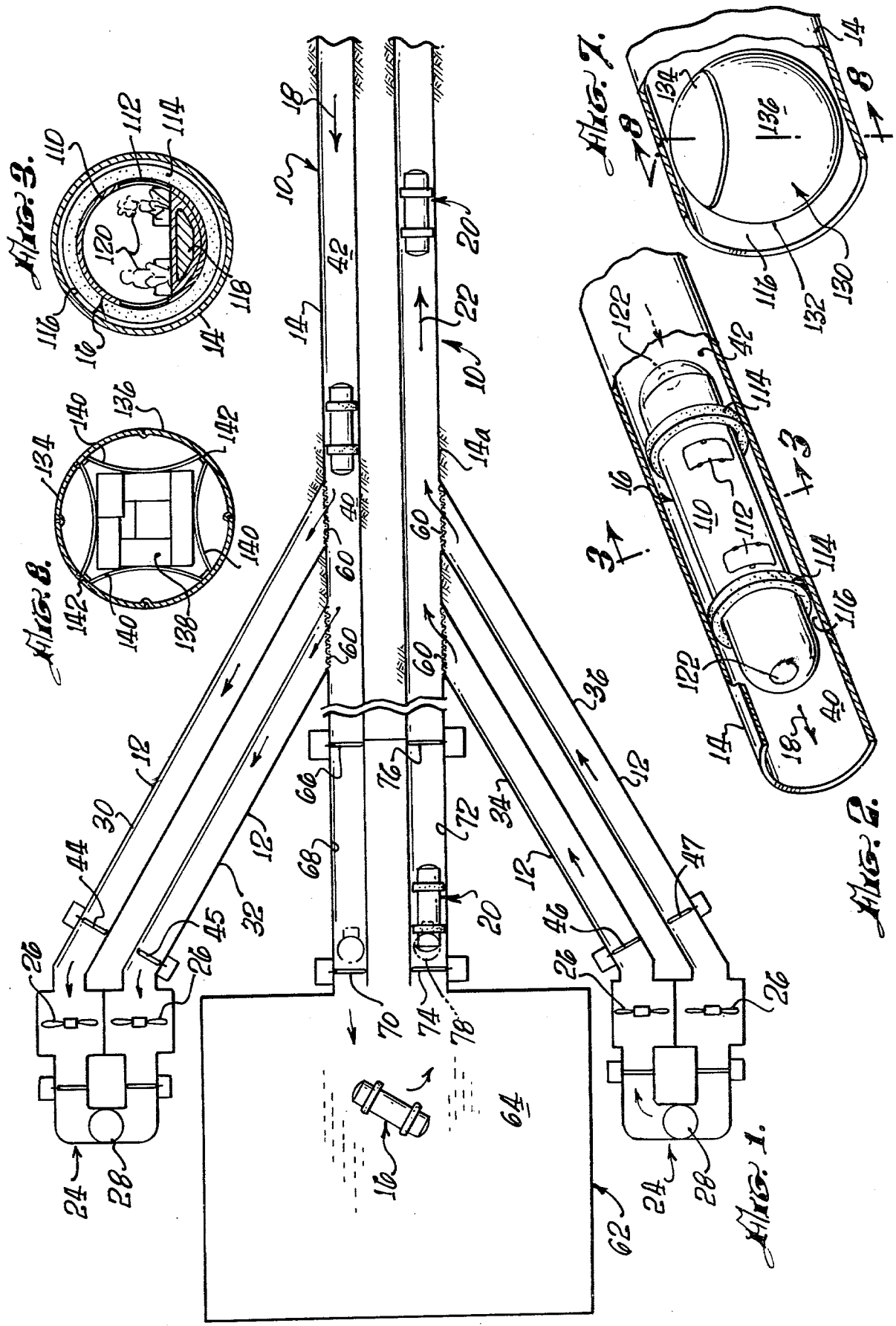

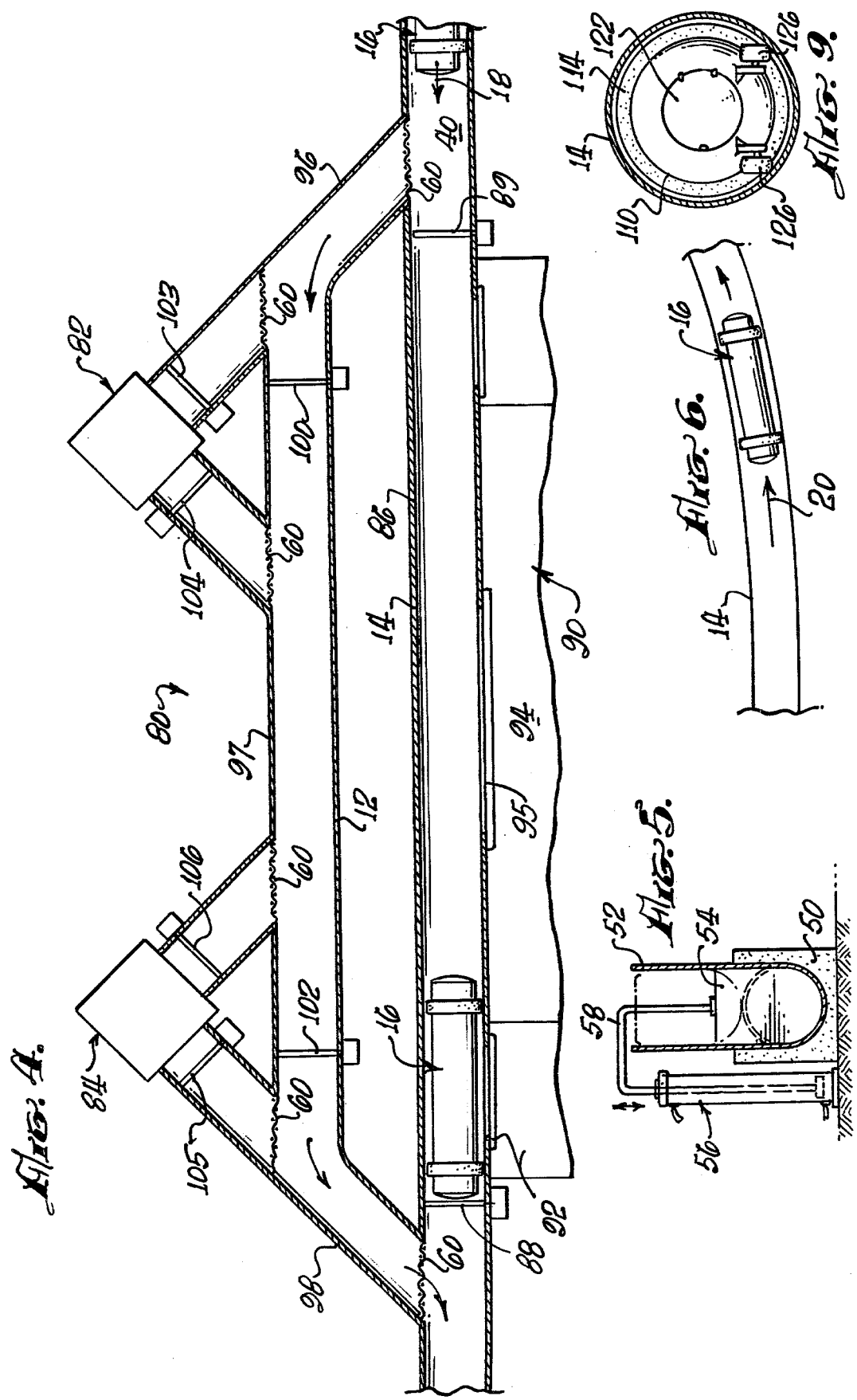

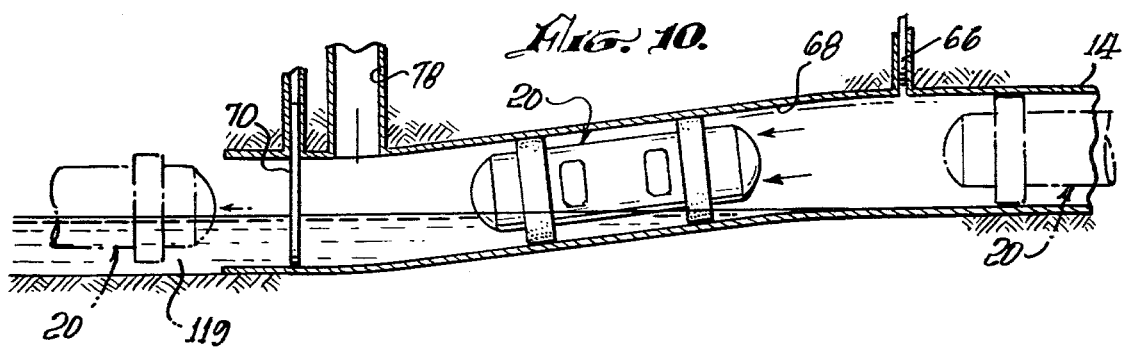
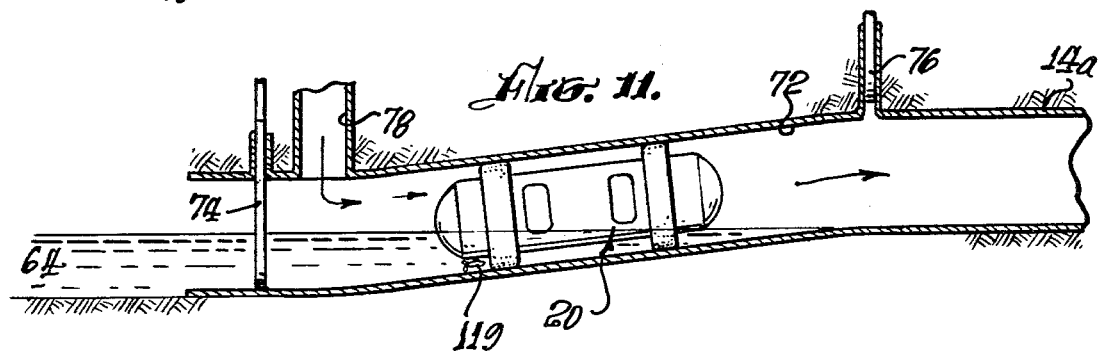
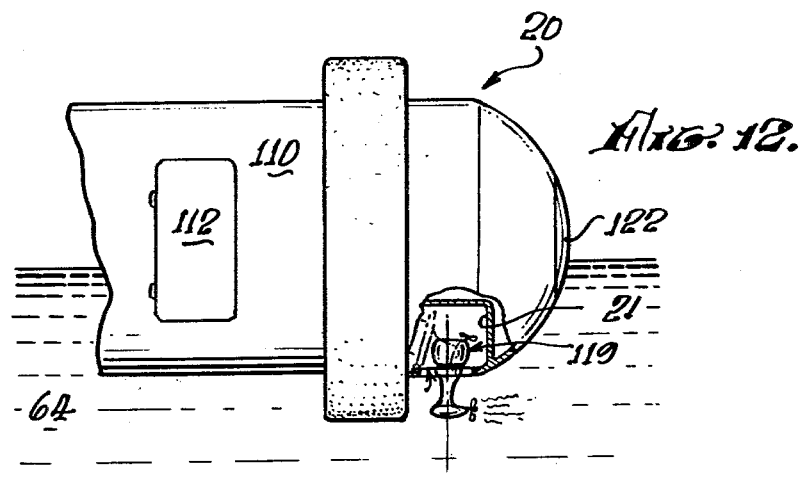
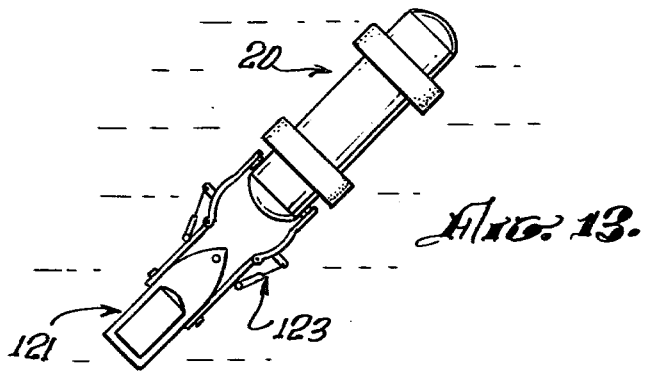

VACUUM-TUBE MASS-TRANSIT SYSTEM

This application is a continuation-in-part of application Ser. No. 745,589, filed Nov. 29, 1976, now abandoned.

BACKGROUND OF THE INVENTION

1. Field of the Invention

This invention relates generally to a transportation system and, more particularly, to a transportation system incorporating a continuous, tubular circuit wherein a vehicle traverses therethrough under a controlled vacuum condition.

2. Description of the Prior Art

As is well known in the art, various problems and difficulties are encountered in providing a suitable and economical rapid-transit system that is compatible with inner-city and cross-continental transportation.

Several proposed transit systems have been suggested, but none have been implemented other than variations of rail systems which have become almost too costly to build and to operate.

Thus, there is a need for a unique transportation system that will include not only passenger service, but cargo service as well, and wherein the transit system can be operated at a very low cost under controlled environmental conditions.

SUMMARY OF THE INVENTION

The present invention relates to a vacuum-tube, mass-transit system which provides transportation for people and freight wherein a vehicle such as a car or capsule is propelled through a tubular conduit system by the production or drawing of a partial vacuum in the closed tube arrangement, by means of blowers or fans located at each terminating end of the tube system.

At least one complete tubular conduit can be employed to transport one or more capsules in either direction. However, two parallel tubes are preferably utilized, each providing for the movement of vehicles or capsules in either direction.

Blowers or fans are provided at each end of the tube and are reversible to facilitate movement of vehicles in either direction, according to the requirements. Thus, the primary means of imparting linear motion to vehicles or capsules is to create a partial vacuum within the closed, tubular conduit, the vacuum being formed on the leading or forward moving side of the vehicle. However, to enhance the effect of the partial vacuum, it may be assisted by the additional application of some degree of positive pressure by blowers, or fans at the opposite end of a tube system, if so desired.

It should be noted that the tubular conduit system can be constructed underground, on the surface, or even elevated overhead. The particular arrangement and location of the tubes will be determined by various types of terrain, whether urban or open territory, etc.

The tubes may be of virtually any length, from short runs of a few city blocks up to thousands of cross-country miles. Thus, the system can run a single capsule or a number of capsules coupled together to form a "train".

The pumps, fans or blowers are provided at each end of the tube system, by which a continuous vacuum is pulled, so that there is no problem of excessive pressure build-up of a moving vehicle. These blowers or fans are powered electrically with stand-by diesel equipment, in the event of power failure.

Various methods can be used to provide speed control of the vehicle; however, it is contemplated that speed control can be effected by proportional closure at the dispatch or "sending" end of the tube, thus forming a partial vacuum behind the vehicle to effect slowing thereof. Hence, the speed of the vehicle can approximately approach that of the flow rate of air created through the tube.

The vehicle or capsule is supported essentially by the air "cushion" produced by the air passing around the vehicle between the tube wall and the vehicle, so that the vehicle more or less "floats", with a minimum of friction. Air is allowed to pass between the vehicle and the tube wall because of the pressure differential produced across the vehicle, wherein the resilient support flanges mounted about the body of the vehicle are so dimensioned that a predetermined space is provided between these flanges and the tube wall. In addition, the resilient flanges also serve to cushion shock during rapid movement of the vehicle or vehicles along the tube conduit.

Located at each terminating end of a complete system is a loading and unloading area comprising a body of water such as a "moat", where passenger and cargo are exchanged. Intermediate loading and unloading stations are contemplated to be included in each long distance transit run, wherein various sequentially operated control gates will be incorporated therein.

Accordingly, the present invention involves the combined operating effects of the drawing of a partial vacuum. The combined effects include the drawing or pulling of the vehicle through the tubular conduit by the action of the pressure differential across the vehicle, and also the vehicle supporting effect of the air flow through the space defined between the vehicle and the tube wall, wherein the air flow is produced by the drawing of the partial vacuum forward of the directional travel of the vehicle.

OBJECTS AND ADVANTAGES OF THE INVENTION

The present invention has for an important object the creation of a mass-transit system formed by a continuous, tubular conduit wherein a partial vacuum is provided therein to propel a vehicle therethrough at various controlled speeds.

It is another object of the invention to provide a vacuum-tube, mass-transit system wherein the vehicles are formed as elongated or spherical capsules for the purpose of transporting passengers and cargo for either urban or cross-country transportation.

It is further another object of the invention to provide a vacuum mass-transit system wherein the vehicles are imparted with motion by means of a pressure differential created across the vehicle body.

It is a further object of the invention to provide a transit system of this type wherein the vehicles employed therewith are supported in a friction-free manner, due to the effect of the air flow through the space defined between the vehicle and the inner wall of the tubular structure.

A still further object of the invention is to provide a transit system of this character that employs blower or fan stations to create a partial vacuum therein.

Still another object of the present invention is to provide a vacuum-tube, mass-transit system that is compatible for use in urban and cross-country transportation.

It is another object of the invention to provide a system of this type that includes loading and unloading terminals that are arranged as moats whereby the vehicles may float on water and be moved from one area to another in the simplest manner—that is, by auxiliary boats, or by an auxiliary motor attached to a respective capsule as it leaves the tube.

It is still another object of the invention to provide a system of this type having relatively few operating elements, wherein it can be easily serviced and maintained.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a schematic, top-plan view of a transit system according to the invention;

FIG. 2 is a perspective view, partially in section, showing a vehicle or capsule disposed in a transit tube;

FIG. 3 is a sectional view taken along line 3—3 of FIG. 2;

FIG. 4 is a plan view of a loading-unloading station, combined with a "booster" blowing or fan station;

FIG. 5 is an elevational, sectional view showing a gate valve utilized with the invention;

FIG. 6 is a schematic view showing the manner in which the vehicle configuration and the flange spacing and proportions permit a vehicle to pass through curved tube portions, without the vehicle itself contacting the tube wall;

FIG. 7 is a perspective view, partially in section, showing a spherical capsule or vehicle for use with the present invention;

FIG. 8 is a sectional view taken along line 8—8 of FIG. 7, showing inflatable cushions utilized with the cargo capsule of FIG. 7, to cushion and center cargo disposed therein;

FIG. 9 is a sectional view similar to FIG. 3 wherein the vehicle includes auxiliary wheels which ride on the inner wall of the tubular conduit; and FIG. 10 is an elevational sectional view of the exit portion or left-most portion of the upper transit tube of the view of FIG. 1;

FIG. 11 is an elevational sectional view of the dispatch portion or left-most portion of the lower transit tube of the view of FIG. 1;

FIG. 12 is an enlarged partial elevational view of a vehicle or capsule utilized with the invention, and showing an auxiliary retractable motor utilized with the vehicle; and FIG. 13 is a plan view showing a boat utilized for maneuvering a passenger or cargo vehicle, the moat or basin shown in FIG. 1.

DESCRIPTION OF THE PREFERRED EMBODIMENT

Referring more particularly to FIGS. 1 through 6, there is shown a vacuum-tube, mass-transit system which basically comprises at least one continuous, tubular conduit, generally indicated at 10, said conduit being formed by various tube sections 12, wherein said tubes are straight lineal sections or curved, as shown in FIG. 6.

However, the preferred arrangement of the invention is contemplated as having two parallel tube conduits 14 and 14a, as shown in FIG. 1, wherein the tube structure 14 is shown having a partial vacuum created on the left of the vehicle, generally indicated at 16. Thus, the direction of travel of vehicle 16 in tube 14 is from right to left, as indicated by arrow 18. The vehicle 20 disposed in tubular conduit 14a moves linearly from left to right, as indicated by arrow 22; hence, vehicle 20 will travel in the opposite direction to that of vehicle 16.

In order to provide the necessary vacuum within each tube system, there is established a vacuum-generating means, such as indicated at 24 which is located adjacent each terminating end of said tubular conduit. The vacuum-generating means comprises pumps, fans or blowers 26 which are housed having an exhaust or inlet stack 28, depending on the particular operation of blowers or fans 26. That is, the blowers or fans 26 are reversible to facilitate movement of vehicles in either a forward or a reverse direction, according to requirements.

Accordingly, the vacuum-generating means is arranged to communicate with its respective tube system by means of branch tubes 30 and 32, and 34 and 36. The respective tubes 30 and 32 are attached to the main tube conduit 14 and are angularly positioned so as not to interfere with the movement of vehicle 16.

As an example, fans 26 are operated in a manner to suck air from the forward area 40 of vehicle 16 and force the air out of stack 28, thereby creating a pressure differential between forward area 40 and rearward area 42. Thus, vehicle 16 is propelled in a linear direction as previously mentioned. However, it should be noted that the effect of the partial vacuum may be assisted by the application of some degree of positive pressure by operating simultaneously the blowers or fans at the opposite end of tube conduit 14, such that air will be drawn in and forced in behind vehicle 16.

It should be understood that the operation as described to propel vehicle 16, is also true for vehicle 20 in tube conduit 14a, with the exception that it is reversed thereto. In addition, each branch tube 30, 32, 34 and 36 are respectively provided with flow-control gates 44, 45, 46 and 47. These gates are sequentially operated to control the effective movement of vehicles within the tubular system.

As an example of a typical type of gate valve, there is shown in FIG. 5 a foundation structure 50 wherein tube 12 is disposed having a valve housing 52 in which a controlled valve member 54 is slidably received. The valve 54 as shown therein is in a closed mode of operation, being positioned by piston 56 having a connecting arm 58 interconnecting to valve 54.

It is contemplated that vacuum-generating manes 24 will be powered electrically in any well-known, suitable manner with stand-by diesel equipment, in the event of power failure.

The controlled speed of the vehicles is effected by the proportional closure arrangements of the gates, such as 44 and 45, at the dispatch or "sending" end of the tube, thus forming a partial vacuum behind the vehicle to effect slowing. However, when the vehicle is traveling between stations, it will approach a speed comparable to the flow rate of air passing through the tube conduit.

Referring again to FIG. 1, there is shown adjacent to the end of tube conduits 14 and 14a a loading-unloading area, referred to as a moat or basin, generally indicated at 62, which contains water 64 for the bouyant storage and maneuvering of a number of vehicles and for the taking on or unloading of passengers or cargo.

The vehicles are conveniently moved about in the basin or moat 62 by any of various conventional means. One such means is a retractable outboard motor 119, shown in FIGS. 12 and 11, which may be permanently mounted on the vehicle, or which may be attachable as needed, either in the position shown in the drawings or in another appropriate position on the vehicle, being attachable as or after a particular vehicle leaves the tube 14.

The vehicles may also be movable in basin 62 by small boats or tugboats, such as boat 121 (FIG. 13) which carries a hydraulically-actuated gripper assembly 123 for quick, efficient securement to and disengagement from, respective vehicles in the handling and moving of vehicles about the basin.

Referring to FIGS. 1 and 10, as vehicle 16 passes through tube conduit 14 toward its exit section 68, gate 66 is quickly opened as it is appraoched by the vehicle, whereupon the vehicle passes into exit section 68, whereupon gate 66 quickly closes and the vehicle moves onward under its momentum. Exit section 68 of the tube contains water to a level approximately ½ its diameter-height, the water serving as a breaking and stopping means for the vehicle, as well as providing bouyant support for the vehicle in conjunction with moat or basin 62 with which section 68 communicates. As shown in FIG. 10, tube exit section 68 is offset downwardly approximately one-half its diameter to provide for storage of water in this section at the level of water 64 in basin 62.

As the capsule or vehicle 16 is slowed and approaches gate 70, this gate quickly allows the vehicle to pass from exit section 68 into the basin 62 whereupon gate 70 quickly closes. The vehicle is then maneuvered to a designated point in moat area 62 for unloading, loading, or storage.

In dispatching a vehicle in the opposite direction, via tube conduit 14a, gate 74 is quickly opened, and the vehicle is moved into dispatch section 72 of tube 14a. Like exit section 68 of tube 14, section 72 is offset downwardly relative to the rest of tube 14a by approximately ½ the diameter of tube 14a, and is filled with water to ½ its diameter or height. A vehicle 16 is moved into dispatch section 72 by any appropriate means as mentioned above, such as by its own outboard motor 119 or by a boat 123. Gate 76 is quickly opened and vent stack 78 is opened, whereupon the vehicle is pneumatically urged or sucked into the main tube conduit 14a, whereupon gate 76 quickly closes.

Vent stack 78 serves as an air-flow inlet means to admit air when the partial vacuum is pulled from the far opposite end of tube 14a, thereby impelling vehicle 16—i.e., the flow through the inlet enables the pulling of the partial vacuum from the far end of said tube 14a.

Some water is pulled with the vehicle along the tube, thus providing lubrication between the tube and the vehicle while accelerating.

Referring now to FIG. 4, there is shown a combination unloading-and-loading station, generally indicated at 80, having a booster blower station designated at 82 and an auxiliary blower station 84. The booster blower station 82 includes fans operated by electrical power, while auxiliary station 84 is diesel powered, for use in the event of electrical power failure, or any other failure of station 82.

Since the unloading-and-loading station 80 will be provided for locations along very long transit tubes, the combined booster station 82 provides supplementary and additional vacuum-producing action, and is particularly useful or needed in association with such long transit tubes that are many miles long.

The unloading and loading station comprises a section of tube 86 having a forward gate 88 and a rear gate 89 which defines the loading-and-unloading zone, generally indicated at 90. Said zone 90 includes at least one passenger door and platform 92, and an adjacent moat 94 having a door 95 adapted to allow a vehicle to pass therethrough into said moat 94.

Gate 89 is opened to permit entry of vehicle 16 into section 86 and then closes, causing the vaccum to by-pass through branch tubes 96, 97, and 98, the booster station 82 and auxiliary station 84 being interconnected through said by-pass means, wherein tube 97 includes flow-control gates 100 and 102. Flow-control gate 100 together with gates 103 and 104, will direct flow through booster unit 82; while gates 102, 105 and 106 control the flow through auxiliary unit 84.

In order to properly operate with the vacuum system as described, vehicle 16 as seen in FIG. 2 comprises an elongated, capsule-like housing 110 having ingress-and-egress door 112 positioned between two resilient, annular flange members or rings 114 spaced apart as shown. These are preferably fabricated of such materials as rubber, with appropriate lubrication, or Teflon. Said flanges 114 are so dimensioned that the desired or predetermined spacing is provided between the outer peripheries of the respective flanges and the inner tube wall 116, so that the predetermined air flow is effected therebetween, thus providing the air "cushion" to support the vehicle and maintaining the appropriate pressure differential across the vehicle to achieve and maintain the desired or selected vehicle speed.

The center of gravity of capsule 16 is positioned below the axial center line of the vehicle and of the tube, in order that said vehicle will not rotate or spin. This center of gravity can be of any suitable means so as to be located as seen at 118 in FIG. 3. FIG. 3 also illustrates passengers 120 seated within the capsule.

Capsule 16 also includes a pair of escape hatches 122 arranged at each end thereof, as shown in FIG. 2. Hatches 122 are hinged from the inside in order to prevent them from being pulled open. Passenger hatches or doors 112 are provided in the capsule outer wall, as previously mentioned; and both doors 112 and hatches 122 may be fabricated of aluminum, Fiberglass or other appropriate material.

It should be noted that an additional feature is contemplated when necessary, this feature being the adding of wheels 126, which will also aid in stabilizing the vehicle, this arrangement being shown in FIG. 9.

However, in FIGS. 7 and 8 there is shown an alternative arrangement of a vehicle, particularly one for transporting cargo, the vehicle being generally indicated at 130. As can be seen, vehicle or capsule 130 is spherical in shape and has no rings or flanges to aid in its movement. The spherical capsule may roll in the transit tube, as well as being supported by the air passing between the spherical outer wall 132 and the tube wall 116, this support being similar to that effected with respect to the elongated capsule, shown in FIG. 2 and described earlier.

A section of the sphere comprises a hatch means 134 which conforms to the spherical configuration, and is removable or hinged to the main body 136 for loading and unloading of the cargo 138, shown disposed therein in FIG. 8.

The center of gravity of the sphere is positioned, as far as feasible, substantially at the geometric center of the sphere. If the load were significantly off-center, the sphere would tend to "bounce"—i.e., there would be an effective mass slammed against wall 116 of the tube at frequent intervals with grating, pounding and friction effects on the tube wall and on the sphere, caused by the rotation of the eccentric mass.

Accordingly, a plurality of inflatable cushions or bags 140 (see FIG. 8), fabricated of appropriate plastic or rubber, etc., are arranged within the sphere to be inflated so as to urge and maintain the cargo load 138. Thus, packages or freight stored therein are supported in the center of the sphere, whereby the positioning of the center of gravity of the load is maintained near the geometric center of the sphere.

Each respective inflatable cushion 140 is attached at the "bottom" of the sphere interior, and at each of the four sides of the sphere interior, as indicated at 142; and one is attached to the above-mentioned, removable hatch 134.

Thus, the rolling movement of the sphere minimizes friction between the sphere and the tube wall. The combination of the air stream between the sphere and the tube wall, which tends to support the sphere and rolling action, results in a minimum friction.

The inventor claims:

1. A vacuum, mass-transit system comprising:
   at least one tubular conduit;
   terminating ends disposed on opposite ends of said tubular conduit;
   a vacuum-generating means located adjacent each terminating end of said tubular conduit, and arranged to communicate therewith;
   a plurality of vacuum, flow-control means positioned between said vacuum generating means and said tubular conduit;
   an unloading-and-loading terminal means disposed at each terminating end, and comprising a predetermined area having water disposed therein defining a moat to receive a vehicle therein;
   at least one vehicle arranged to be moved linearly within said tubular conduit by said vacuum-generating means;
   means to move said vehicles within said moat;
   means to stop the forward motion of said vehicle prior to entering said unloading-and-loading terminal, said stop means being interposed between said terminating ends of said conduit and respective terminals thereof;
   said stop means comprises a tubular section connected to said conduit arranged to be separately controlled from said vacuum generating means;
   a first gate means allowing said vehicle to enter said tubular section;
   a second gate means allowing said vehicle to enter said moat; and
   water disposed in said tubular section whereby the linear motion of said vehicle is restrained, and wherein said vehicle is allowed to be moved from said water of said tubular section into said moat for loading and unloading.

2. A vacuum, mass-transit system as recited in claim 1, wherein said vacuum generating means comprises:
   a pair of blowers;
   a pair of branch conduits disposed between each of said blowers and said conduit, whereby a vacuum is created by the operation of said blowers; and
   an inlet-outlet stack to allow flow of air in either direction to control the speed of said vehicle through said tubular conduit, from one end to the other.

3. A vacuum, mass-transit system as recited in claim 2, wherein said vacuum control means comprises an air-flow control-valve gate, one being disposed in each of said branch conduits to control the speed and direction of linear motion of said vehicle.

4. A vacuum, mass-transit system as recited in claim 3, wherein said vehicle comprises:
   an elongated capsule;
   means to react with said vacuum passing through said conduit to effect a controlled linear movement of said capsule;
   at least one door hatch arranged in the body of said capsule to allow ingress and egress of passengers or cargo to be transported thereby; and
   a pair of escape hatches positioned in respective ends of said capsule.

5. A vacuum, mass-transit system as recited in claim 4, wherein said capsule includes means to accommodate passengers therein.

6. A vacuum, mass-transit system as recited in claim 4, wherein said capsule includes means to accommodate cargo therein.

7. A vacuum, mass-transit system as recited in claim 4, wherein said means to react to effect a controlled linear movement of said capsule comprises a pair of annular ring members affixed to the outer body of said capsule, each being disposed adjacent opposite ends of said capsule so as to be arranged between the capsule and the inner wall of said conduit.

8. A transit system as recited in claim 7, including a vehicle-support means comprising a predetermined layer of air spaced between the outer peripheries of the respective rings and the inner conduit wall thereof, wherein a predetermined air flow is effected therebetween.

9. A transit system as recited in claim 8, wherein the system includes intermediate unloading-and-loading stations located at predetermined sections of said conduit, said stations including a vacuum-generating means therein, a vacuum by-pass section to allow vacuum flow to continue while loading and unloading; and a plurality of vacuum control gates disposed in said vacuum conduit and said by-pass section.

10. A transit system as recited in claim 9, wherein said unloading and loading station includes:
    a passenger ingress and egress area; and
    a water-filled moat to receive said vehicle.

11. A transit system as recited in claim 3, wherein said vehicle comprises:
    a spherical cargo carrier having a removable hatch; and
    a plurality of inflatable cushions whereby said cargo is held in position within said sphere to locate the center of gravity substantially in the geometric center of said sphere.

12. A vacuum, mass-transit system having vehicles arranged for linear travel therein comprising:

first and second parallel main tubes having opposite terminating ends, wherein said first main tube forms a conduit arranged to allow linear travel of said vehicle in one direction, and said second main tube forming a conduit arranged to allow linear travel of said vehicle in the opposite direction to said first tube;

a vacuum-generating means located adjacent each terminating end of each tube, wherein a partial vacuum is established on the forward side of the direction of travel of said vehicle;

a vacuum-control-flow means disposed between said vacuum generating means and said main tubes;

an unloading-and-loading terminal means located at each terminating end of each tube and positioned between said vacuum generating means, said terminal means comprising:

means to slow and stop the forward motion of said vehicle prior to entering said unloading-and-loading terminal, said stop means being interposed between said terminating ends of said tubes and said terminal thereof;

a body of water defining a moat having loading-and-unloading areas arranged therein, and wherein said slow and stop means comprises:

a tubular section having water disposed therein communicating with said water in said defined moat of said terminal;

first and second control gates positioned forward and rearward of said tubular section; and an auxiliary operating means removably secured to said vehicle to move said vehicle within said unloading-and-loading terminal.

13. A vacuum, mass-transit system as recited in claim 12, wherein said generating means comprises:

a plurality of blowers;

a plurality of branch tubes arranged to communicate with said main tubes, whereby a partial vacuum is generated therein ahead of the moving vehicle, and wherein a pressure differential is created across the body of said vehicle.

14. A vacuum, mass-transit system as recited in claim 13, including means for freely supporting said vehicle within said tube during transporting thereof.

15. A vacuum, mass-transit system as recited in claim 14, wherein said means for freely supporting said vehicle comprises:

a pair of spaced-apart, annular, resilient flanges mounted to the body of said vehicle, and arranged between said vehicle and the inner wall of said conduit; and a predetermined spacing provided between the peripheries of the respective flanges and said inner wall of said conduit, to allow a predetermined air flow to pass therebetween.

* * * * *